United States Patent Office 3,417,972
Patented Dec. 24, 1968

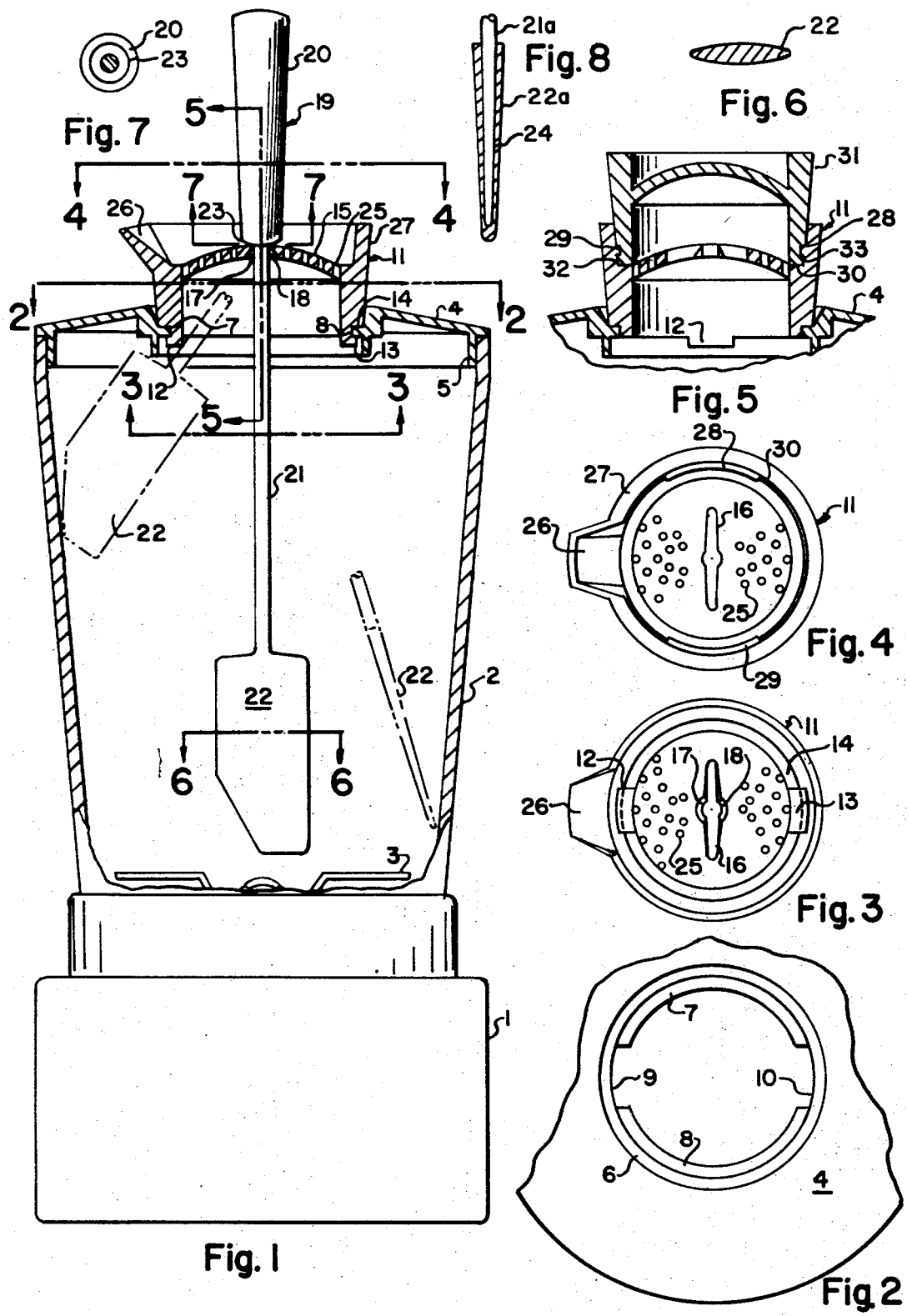

3,417,972
BLENDER JAR WITH STIRRER AND STRAINER
Conway Vincent, Canton, Ohio, assignor to The Hoover Company, Canton, Ohio, a corporation of Ohio
Filed Jan. 31, 1968, Ser. No. 702,019
10 Claims. (Cl. 259—37)

ABSTRACT OF THE DISCLOSURE

A blender jar has a stirrer mounted in its removable top cover to feed thick materials into the agitator. Means is provided to prevent contact of the stirrer with the agitator. The cover may also include a strainer to strain liquid from the jar after solid material has been shredded by the agitator.

Background of the invention

The invention pertains to the field of art including attachments and accessories for food blenders or comminutors of the type wherein mixing and cutting blades are rotatably mounted on a vertical axis in the bottom of an open top jar and an electric motor power unit rotates the blades at high speed. The specific accessories are a stirrer and s rainer mounted in a lid for the open top jar.

Prior art teachings of food comminutors including stirrers or spatulas for feeding material into the agitator are found by way of example in U.S. Patent 3,346,029; British Patent 401,734; and German Patent 1,028,906. In the U.S. patent there is no teaching of using the spatula when the jar top is closed by a lid and this is desirable to keep material from being thrown out of the jar by the rapidly rotating agitating blades. In the British patent there is no teaching of using a removable cover for the food hopper in combination with the spatula. This makes it difficult to clean the gimbal rings and leaves the upper sides always open. In the German patent the stirrer is on a fixed axis and cannot be pivoted or moved longitudinally to reach desirable areas at the will of the operator. Prior art teachings of blender jars and jars in general with strainers are given by way of example in British 698,697; U.S. 3,081,912; and U.S. 3,248,016. It would be desirable to have the strainer feature combined with the stirrer feature and this is not suggested by the prior art.

Summary

In food blenders or comminutors of the type having mixing and cutting blades rotatably mounted on a vertical axis in the bottom of the blender jar it is conventional to prepare foodstuffs having a rather high viscosity such as cheese dips and fillings which have a consistency similar to peanut butter. Such materials are thrown outwardly and upwardly against the inside walls of the jar where they cling and do not readily flow back into the mixing blades. It is usually necessary to turn the blender off and remove the jar lid to scrape the material off the jar walls and into the mixing blades with a spatula or the like. If the blender is not turned off when scraping the walls with a spatula there is danger of hitting the mixing blades with the spatula and this could result in contamination of the food, damage to the blender or injury to the person holding the spatula. Also, material pushed into the blades when the lid is not on the blender jar is likely to be thrown upward out of the jar by the rapidly rotating blades which will make a mess of walls or cabinets in the vicinity of the blender. In accordance with the present invention an arrangement is provided in a blender whereby a spatula may be used to scrap viscous foodstuff off the blender jar walls while the mixing blades are rotating and without danger of contacting the blades with the spatula. The present arrangement also provides a lid closure for the blender jar at the same time the spatula is being used with the blades rotating so that no food will be thrown upward out of the jar.

A food blender is often used to shred or chop raw vegetables such as cabbage and carrots. It is usually recommended that this be done with some plain water in the blender jar in order to obtain circulation of large vegetable pieces into and out of the mixing blades. Certain beverages are prepared in blenders in the presence of ice and large pieces of ice sometimes remain even though the beverage is fully mixed. It is desirable to have a strainer on the blender jar itself so that liquid can be drained off to leave the solid material in the blender jar. Such a strainer is advantageously combined with the spatula feature and includes a cap for selectively blocking the straining opening if so desired. The strainer is preferably centrally located in the removable lid for the blender jar so that liquid thrown up the sides of the jar and striking the peripheral area of the lid will not exit through the strainer.

Brief description of the drawing

FIGURE 1 is an elevational view showing a conventional food blender embodying the features of the present invention and with portions cut away for clarity.

FIGURE 2 is a top plan view looking in the direction of arrows 2—2 of FIGURE 1 and showing only a portion of the jar lid and the central opening in it.

FIGURE 3 is a bottom plan view looking in the direction of arrows 3—3 of FIGURE 1 and showing only the strainer and spatula support.

FIGURE 4 is a top plan view taken in the direction of arrows 4—4 of FIGURE 1 and showing only the strainer and spatula support.

FIGURE 5 is a sectional elevational view taken in the direction of arrows 5—5 of FIGURE 1 with the spatula omitted and the top of the strainer closed by a closure element.

FIGURE 6 is a sectional view taken on line 6—6 of FIGURE 1 showing the cross-section of the scraper.

FIGURE 7 is a sectional view taken on line 7—7 of FIGURE 1 showing the bottom of the spatula handle.

FIGURE 8 is a sectional view showing an optional form of scraper for the spatula.

Description of the preferred embodiment

FIGURE 1 shows a blender including base unit 1 which encloses an electric motor. Blender jar 2 has an open top, and mixing and cutting blades 3 are rotatably mounted on a vertical axis centrally located in the bottom of jar 2. Jar 2 is positionable on base 1 and blades 3 are driven by the electric motor in base 1 through a separable coupling so that jar 2 can be removed from base 1.

The open top of jar 2 is circular and is closed by a lid 4 which is preferably molded in one piece of a flexible synthetic plastic material such as relatively soft and flexible polyvinyl chloride. Lid 4 has a depending circumferential flange 5 which fits snugly inside the open top of jar 2 and frictionally engages the top inner wall surface of jar 2.

Lid 4 has a centrally located circular opening 6 therein. Ribs 7 and 8 project inwardly from opposite sides of opening 6 and each extends over an arc of around 160 degrees to define oppositely disposed notches 9 and 10. Opening 6 is closed by a closure element defining a straining and spatula supporting member 11 which has a pair of oppositely disposed outwardly extending projections 12 and 13 on its bottom periphery. The bottom periphery of closure element 11 is stepped inwardly to define a horizontal shoulder 14 spaced above projections 12 and 13. Projections 12 and 13 on closure element 11 are receivable in notches 9 and 10, and closure element 11 is then rotatable to trap ribs 7 and 8 between projections 12 and 13 and shoulder 14. If desired, the bottom edges of ribs 7 and 8 may be sloped from one end to the other so that there is a wedging action on projections 12 and 13.

Closure element 11 is preferably molded in one piece of rigid synthetic plastic material such as rigid styrene acrylonitrile. Closure element 11 has a top wall 15 with a central aperture 16 therethrough in the form of an elongated slot with a larger circular center portion. At the larger circular center portion of aperture 16 the underside of wall 15 is tapered as at 17 and 18 at around 35 degrees from vertical.

A stirrer element 19 includes handle 20, rod portion 21 and scraper portion 22. Stirrer 19 may be molded in one piece of synthetic plastic material such as a synthetic polyamide resin although all or portions of the stirrer may be made of other materials such as wood, metal or rubber. Scraper portion 22 has a cross-sectional shape as shown in FIGURE 6 which is substantially the same as the shape of aperture 16 in closure element 11 with aperture 16 being of slightly larger size so that scraper 22 may pass through aperture 16. The bottom of handle 20 is rounded at 23 and is circular as shown in FIGURE 7. The bottom of handle 20 is larger than aperture 16 and forms a stop in cooperation with the top surface of wall 15 so that scraper 22 can extend only a certain distance down into jar 2. The distance between the bottom of handle 20 and the bottom or tip of scraper 22 is slightly less than the distance from the top of blades 3 to the top of wall 15. With this arrangement there is no danger of contacting blades 3 with scraper 22. Rod portion 21 is preferably circular and stirrer 19 can be moved axially, pivotally and rotatably relative to lid 4 and closure element 11 as shown by way of example in two dashed line positions. Tapered portions 17 and 18 on the underside of wall 15 permit sideways pivoting of stirrer 19 throughout 360 degrees. Rounded bottom 23 of handle 20 permits easy pivoting and turning of stirrer 19 at the maximum reach of scraper 22 and scraper 22 may be guided around the entire periphery of jar 2 by simply turning handle 20 through the path of a cone. Scraper 22 may be flexible so as to conform to the curved inner surface of the walls on jar 2 and if scraper 22 is rather rigid it may have its flat sides rounded outwardly as shown in FIGURE 6 at the same radius as the curved walls of jar 2. Stirrer 19 may be removed from jar 2 by lifting it axially upward with scraper 22 algned with aperture 16. The close fit of scraper 22 in aperture 16 will clean scraper 22 of viscous material clinging to it and such material will fall down into blades 3.

FIGURE 8 shows an alternative for the scraper wherein scraper 22a is made of rubber or other flexible material and has an axial hole 24 molded into it. Hole 24 is of smaller cross-sectional shape than rod 21a so that scraper 22a is frictionally retained on rod 21a but can be removed by pulling it. With this arrangement aperture 16 would not have to be the same shape as the scraper and the stirrer could be removed from closure element 11 by removing scraper 22a from rod 21a. Instead of having the scraper removable from the rod the handle 20 could be removable in the same manner.

Wall 15 of closure element 11 has a plurality of small diameter holes therethrough and only one of which is indicated by a numeral 25. The holes may be one eighth of an inch in diameter although they may be smaller or larger depending upon how fine a straining function is desired. Solid material which is broken into pieces in jar 2 by blades 3 can be separated from liquid present by straining through the holes in closure element 11. Extending upwardly around wall 15 is a wall 27 which is formed into a pouring spout at 26. As shown in FIGURE 1 the top edge of pouring spout 26 is below the plane of the top edge of wall 27. The top edge of wall 27 lies in a horizontal plane so the jar may be inverted and supported on a surface by the top edge of wall 27. The lower height of the top edge of pouring spout 26 will leave a gap between the top edge of wall 27 and the surface on which it rests so that liquid may drain out. In this manner jar 2 may be inverted and placed in a sink or on a drainboard to separate liquid from solids in jar 2.

The inner surface of wall 27 has ribs 28 and 29 projecting inwardly therefrom and spaced above flat periphery 30 of wall 15. Ribs 28 and 29 corresponds to ribs 7 and 8 in lid 4. A measuring cup member 31 in FIGURE 5 has opposite outwardly extending projections 32 and 33 at its bottom which are the same as projections 12 and 13 on closure element 11. Measuring cup member 31 is then held in closure element 11 in the same manner that closure element 11 is held in opening 6 in lid 4. Measuring cup member 31 completely closes all holes in wall 15 of closure element 11. The dimensions of the securing portions of opening 6 in lid 4, closure element 11 and measuring cup 31 are the same so that cup 31 fits either closure element 11 as shown in FIGURE 5 or will fit hole 6 in the same manner as closure 11. Cup 31 may be used in place of closure 11 when no stirrer or strainer feature is needed. Cup 31 may then be stored in closure 11 when the closure with stirrer and straining feature are placed in hole 6. Wall 15 is preferably spaced above the top of lid 4 as shown in FIGURE 1 so that material thrown up the sides of jar 2 by blades 3 and striking the bottom periphery of lid 4 will be unlikely to exit through the holes in wall 15.

The embodiments of the present invention shown and described are only illustrative and are not to be taken in a limiting sense. The present invention includes all equivalent variations and is limited only by the scope of the claims.

I claim:

1. In a blender jar having agitating means mounted in the bottom thereof and removable cover means on the top thereof, said cover means having an opening therein, stirrer means received in said opening for movement axially, rotatably and pivotally relative to said cover means, said stirrer means including an elongated rod received in said opening, stop means on said rod above said opening, handle means on said rod above said stop means, scraper means on said rod below said opening, and abutment means on said cover means adjacent said opening, said abutment means cooperating with said stop means and preventing movement of said rod axially downward past said stop means, the distance between the bottom of said stop means and the bottom of said scraper means being slightly less than the distance between the top of said abutment means and the top of said agitating means.

2. The device of claim 1 wherein said stop means is on the bottom of said handle means and defines a first structure, and said scraper means defines a second structure, one of said structures being detachable from said rod.

3. The device of claim 1 wherein said cover means has a plurality of small apertures therein defining straining means.

4. The device of claim 1 wherein said scraper means is flat and said cover means has an elongated slot therein as part of said opening, said slot being of substantially the same cross sectional shape as said scraper means and of slightly larger area.

5. The device of claim 1 wherein said opening in said cover means has a closure element removably received therein, said closure element having a hole therethrough receiving said rod and said abutment means being defined by the top surface of said closure element.

6. The device of claim 5 wherein said closure element has a plurality of small apertures therein defining straining means.

7. The device of claim 6 wherein said stirrer means is removable from said hole and the top peripheral portion of said closure element defines an outlet, said outlet and said opening in said cover being of substantially the same size, and a measuring cup member removably received in said outlet.

8. The device of claim 6 wherein the top peripheral edge of said closure element lies in a substantially horizontal plane and defines a support for supporting said blender jar on a surface in inverted position, and a part of said peripheral edge being recessed below said plane to define a straining exit.

9. The device of claim 8 wherein said straining exit is formed as a pouring spout.

10. In a blender jar having agitating means in the bottom thereof and a removable cover on the top thereof, said cover having an opening therein through which material can be added to said jar, the improvement comprising; a closure element removably received in said opening, the top portion of said closure element having a plurality of small apertures therein defining straining means, the top peripheral edge of said closure element defining an outlet, said outlet and said opening being of substantially the same size and shape, and a measuring cup member removably received in said outlet and closing said outlet, said measuring cup member being receivable in said opening to close said opening when said closure element is removed from said opening.

References Cited

UNITED STATES PATENTS

| | | | |
|---|---|---|---|
| 1,328,652 | 1/1920 | Ehlers | 259—99 |
| 2,559,196 | 7/1951 | Medved | 259—116 XR |
| 2,733,052 | 1/1956 | Luther | 259—122 |
| 3,240,435 | 3/1966 | Otto | 259—116 XR |

WALTER A. SCHEEL, *Primary Examiner.*

J. M. BELL, *Assistant Examiner.*

U.S. Cl. X.R.

259—99, 116, 122; 146—68